US009415663B1

(12) United States Patent
Soffin et al.

(10) Patent No.: US 9,415,663 B1
(45) Date of Patent: Aug. 16, 2016

(54) VEHICLE WINDOW ASSEMBLY

(71) Applicant: Nissan North America, Inc., Franklin, TN (US)

(72) Inventors: Kyle Soffin, Chesterfield, MI (US); Taiji Ikeda, Novi, MI (US); John-Paul LaPorte, Farmington Hills, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 14/593,652

(22) Filed: Jan. 9, 2015

(51) Int. Cl.
*B60J 1/16* (2006.01)
*B60J 1/00* (2006.01)
*B60J 1/18* (2006.01)

(52) U.S. Cl.
CPC *B60J 1/003* (2013.01); *B60J 1/004* (2013.01); *B60J 1/18* (2013.01); *B60J 1/1846* (2013.01)

(58) Field of Classification Search
CPC .................................................... B60J 1/1853
USPC ............ 296/190.08–190.11, 146.15, 146.16, 296/201, 145, 147; 49/125, 413, 169–171, 49/374
See application file for complete search history.

(56) References Cited

U.S. PATENT DOCUMENTS 4,124,054 A * 11/1978 Spretnjak .............. E06B 3/4681 160/90
4,133,574 A * 1/1979 Martin ............... B60H 1/00378 165/43
5,658,040 A * 8/1997 Nicholls ............ B62D 33/0617 296/146.15
6,286,891 B1 * 9/2001 Gage .......................... B60J 1/06 296/146.15
6,691,464 B2 * 2/2004 Nestell .................. B60J 1/1861 49/374
6,902,224 B2 * 6/2005 Weinert ................. B60J 1/1853 296/146.16
7,003,916 B2 * 2/2006 Nestell .................. B60J 1/1853 49/125
7,185,943 B2 * 3/2007 Lesle .................... E05F 15/652 296/146.16
RE40,636 E * 2/2009 Weinert ................. B60J 1/1853 296/146.16
7,641,265 B2 * 1/2010 Seiple .................... B60J 1/1853 296/190.1
8,246,101 B2 * 8/2012 Cicala ..................... B60J 1/1861 296/146.16
2002/0070582 A1 * 6/2002 Pyo ...................... B62D 47/003 296/146.2
2005/0150170 A1 * 7/2005 Lahnala ................. B60J 1/1853 49/413
2006/0032140 A1 * 2/2006 Arimoto ............... E05F 15/646 49/209
2006/0260205 A1 * 11/2006 Dufour .................. B60J 1/1853 49/413
2008/0060275 A1 * 3/2008 Recker .................. B60J 1/1853 49/408
2010/0122494 A1 * 5/2010 Lahnala .............. E05D 15/0686 49/358
2010/0122497 A1 * 5/2010 Lahnala ................. B60J 1/1853 49/413
2012/0110915 A1 * 5/2012 Lahnala ................. B60J 10/042 49/413
2013/0255156 A1 * 10/2013 Snider .................... B60J 1/1853 49/130
2015/0042127 A1 * 2/2015 Lahnala ............... B60J 10/0062 296/190.1
2015/0101254 A1 * 4/2015 Tooker ................... B60J 1/1853 49/413
2015/0115649 A1 * 4/2015 Tooker ................... B60J 1/1853 296/146.16

* cited by examiner

*Primary Examiner* — Dennis H Pedder
(74) *Attorney, Agent, or Firm* — Global IP Counselors, LLP

(57) ABSTRACT

A vehicle window assembly includes a first transparent member, a second transparent member and a mounting structure. The first transparent member is disposed in an aperture of a vehicle. The second transparent member is disposed in the aperture of the vehicle. The mounting structure supports the first transparent member and the second transparent member, and the second transparent member is supported by the mounting structure so as to be angled relative to the first transparent member.

19 Claims, 6 Drawing Sheets

VEHICLE WINDOW ASSEMBLY

BACKGROUND

1. Field of the Invention

The present invention generally relates to a vehicle window assembly. More specifically, the present invention relates to a pick-up truck vehicle rear window assembly with two transparent members.

2. Background Information

Pick-up truck vehicles can have a rear window structure that includes a movable central glass portion. When the central glass portion moves, an access opening is created in the interior passenger compartment of the vehicle. The access opening can be used for ventilation, or providing access between the cargo bed and the interior passenger compartment. Conventional pick-up truck vehicles generally have a cab structure that includes a substantially vertical rear pillar. A vertical rear pillar can accentuate the angle between the cargo bed and the cab portion (i.e., interior passenger compartment).

SUMMARY

It has been discovered that a vertical rear cab pillar in pick-up truck vehicles causes reflection of lights inside the interior passenger compartment due to a vertical rear window. These reflected lights increase glare and may cause reduced visibility on devices in the passenger compartment, such as a display screen. Therefore, it is desirable to provide a vehicle window assembly for a substantially vertical pillar while reducing reflection and glare inside of the interior passenger compartment.

In view of the state of the known technology, one aspect of the present disclosure is to provide a vehicle window assembly comprising a first transparent member, a second transparent member and a mounting structure. The first transparent member is disposed in an aperture of a vehicle. The second transparent member is disposed in the aperture of the vehicle. The mounting structure supports the first transparent member and the second transparent member, and the second transparent member is supported by the mounting structure so as to be angled relative to the first transparent member.

Another aspect of the present disclosure is to provide a rear window structure for a passenger compartment of a vehicle, comprises a pair of vertical pillars and a window assembly. The pair of vertical pillars define a rear window aperture. The window assembly is installed in the rear window aperture. The rear window assembly comprises a first transparent member, a second transparent member, and a mounting structure. The mounting structure supports the first transparent member and the second transparent member, with the second transparent member being supported by the mounting structure to be positioned inboard of the first transparent member and angled relative to the first transparent member by having an upper end of the second transparent member positioned further inboard of a lower end of the second transparent member.

BRIEF DESCRIPTION OF THE DRAWINGS

Referring now to the attached drawings which form a part of this original disclosure.

DETAILED DESCRIPTION OF EMBODIMENTS

Figure 1:
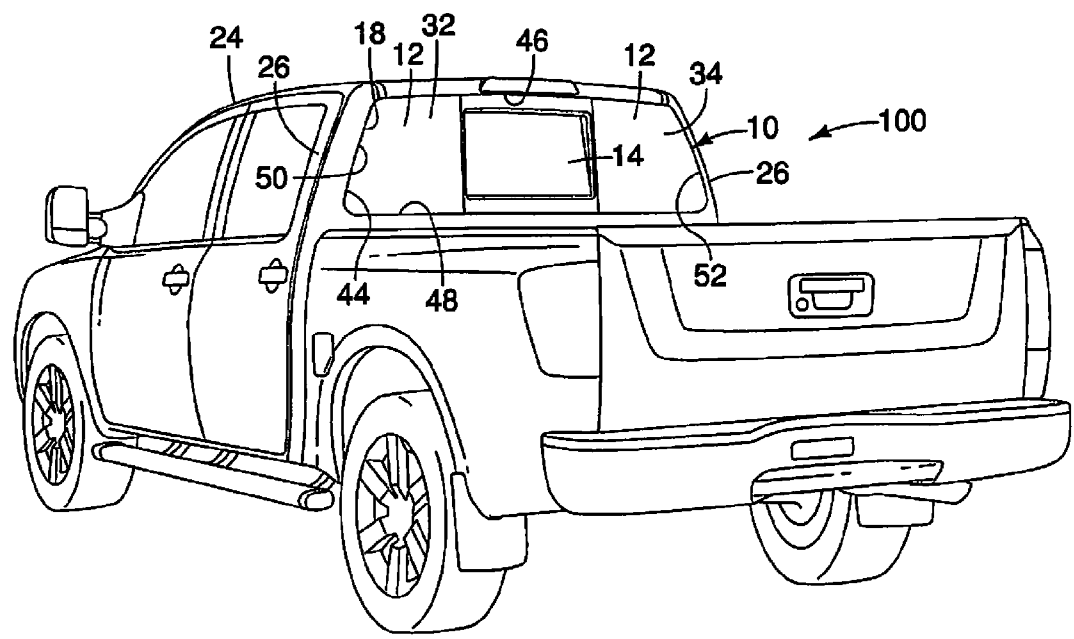
FIG. 1 is a rear perspective view of a vehicle window assembly according to one embodiment disposed in a vehicle.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring initially to FIGS. 1-4, a vehicle window assembly 10 is illustrated in accordance with a first embodiment. The vehicle window assembly 10 is generally disposed as the rearward-facing window in the cab of a pick-up truck vehicle 100. However, it is noted that the vehicle window assembly 10 can be disposed so as to face in any suitable direction in any suitable vehicle.

The vehicle window assembly 10 includes a first transparent member 12, a second transparent member 14 and a mounting structure 20. The first and second transparent members 12, 14 can be panels formed from any suitable material that would enable viewing from inside of a vehicle passenger compartment 16 to the exterior of the vehicle. In one embodiment, the first and second transparent members 12, 14 are formed from glass, but may be formed from any suitable material that would enable viewing from the interior passenger compartment to the exterior of the vehicle.

Figure 2:
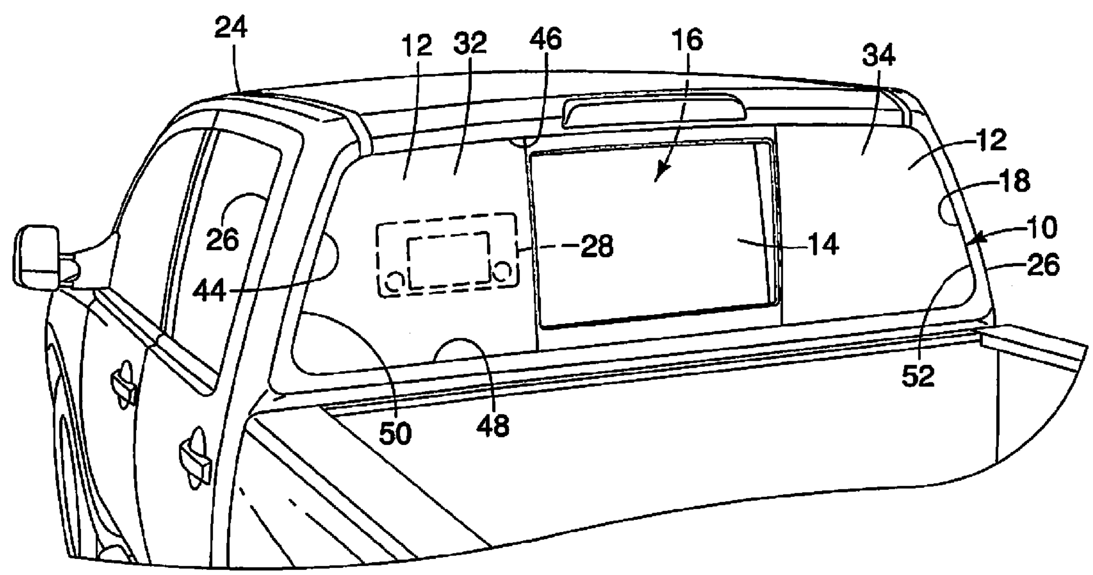
FIG. 2 is a top rear perspective view of vehicle window assembly shown in FIG. 2.

As shown in FIGS. 1 and 2, the pick-up truck vehicle 100 generally has a cab structure 24 with substantially vertical rear pillars 26. The substantially vertical rear pillars 26 accentuate the angle between the cargo bed and the vehicle passenger compartment 16, allowing both the vehicle passenger compartment 16 of the pick-up truck vehicle 100 and the cargo bed to have the largest interior space. However, the vertical rear pillars 26 generally cause a vertical rear window, which can causes reflection of lights inside the vehicle passenger compartment 16.

Figure 3:
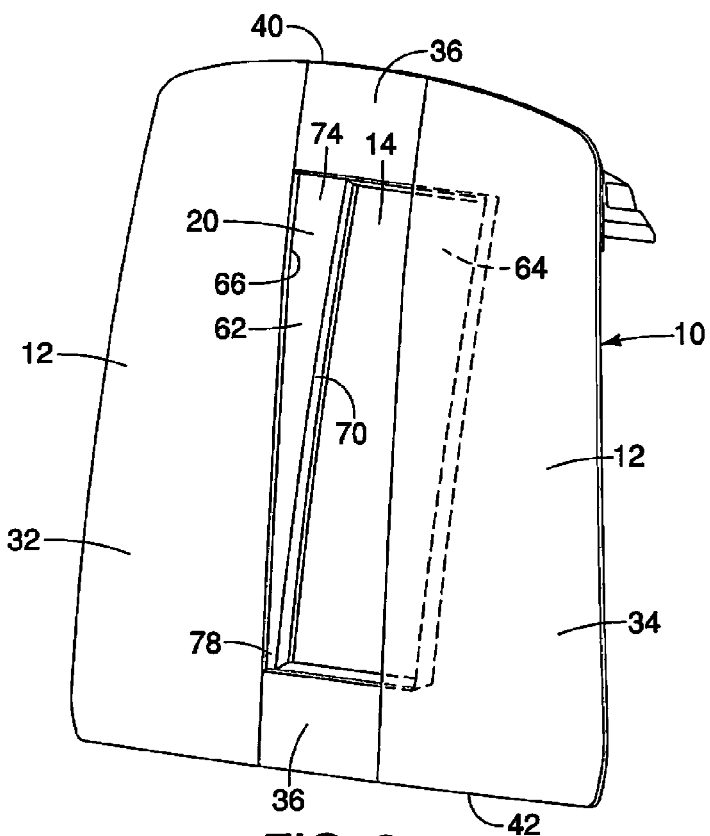
FIG. 3 is a side perspective view of the vehicle window assembly shown in FIG. 1 with the vehicle removed.

Thus, as shown in FIGS. 2 and 3, and discussed herein, the vehicle window assembly 10 includes the second transparent member 14 disposed at an angle other than vertical to reduce the reflection and glare of lights onto an instrument panel inside the vehicle passenger compartment 16. In one embodiment, the second transparent member 14 is a movable central glass section that is canted forward from vertical relative to a first transparent member 12 to eliminate the reflection and glare from a display unit 28 (e.g., a navigation display) mounted at the center of an instrument panel of the vehicle passenger compartment 16. The second transparent member can be disposed so as to be canted or angle to extend forwardly into the passenger compartment or rearward away from the passenger compartment.

The first transparent member 12 is disposed in an aperture 18 of the vehicle 100. The second transparent member 14 is also disposed in the aperture 18 of the vehicle 100. The mounting structure 20 supports the first transparent member 12 and the second transparent member 14, and the second transparent member 14 is supported by the mounting structure 20 so as to be angled relative to the first transparent member 12.

Figure 4:
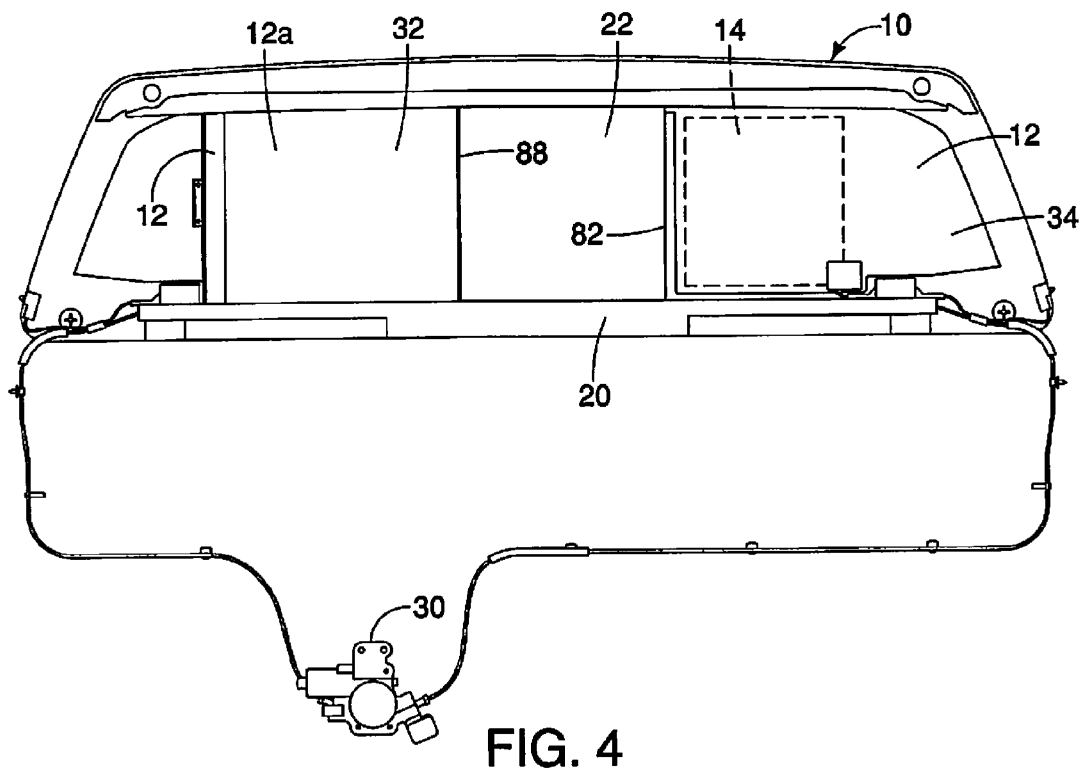
FIG. 4 is a front view of the vehicle window assembly shown in FIG. 3 with the second transparent member moved to form an opening in the vehicle window assembly.
Figure 5:
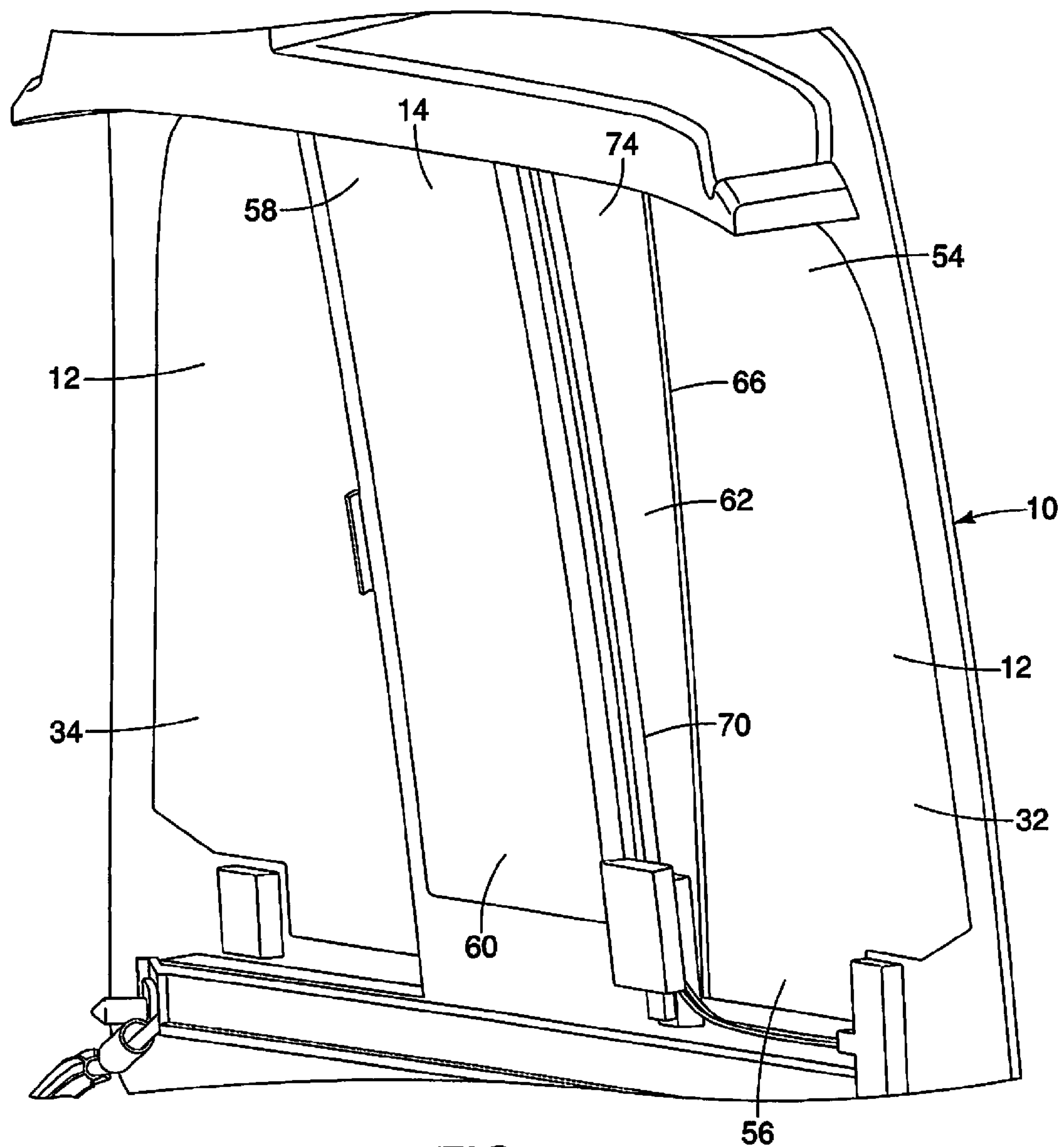
FIG. 5 is a front perspective view of the vehicle window assembly shown in FIG. 3.
Figure 6:
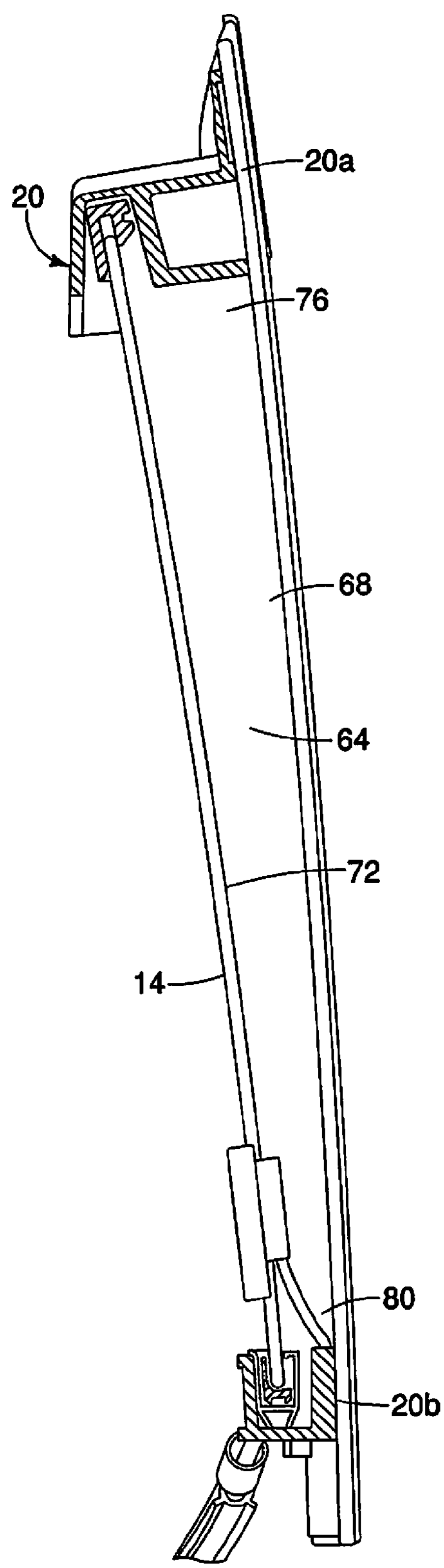
FIG. 6 is a side view of the vehicle window assembly shown in FIG. 5.
Figure 7:
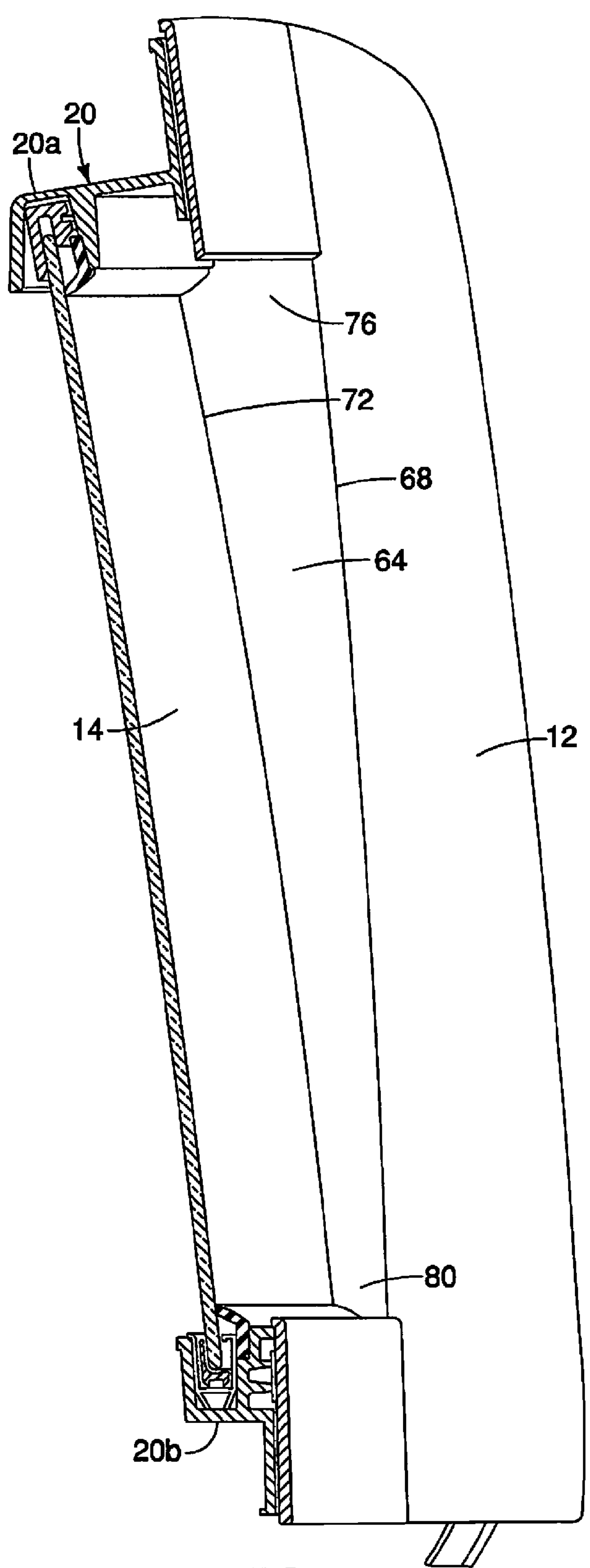
FIG. 7 is a rear cross-sectional side perspective view of the vehicle window assembly shown in FIG. 6.
Figure 8:
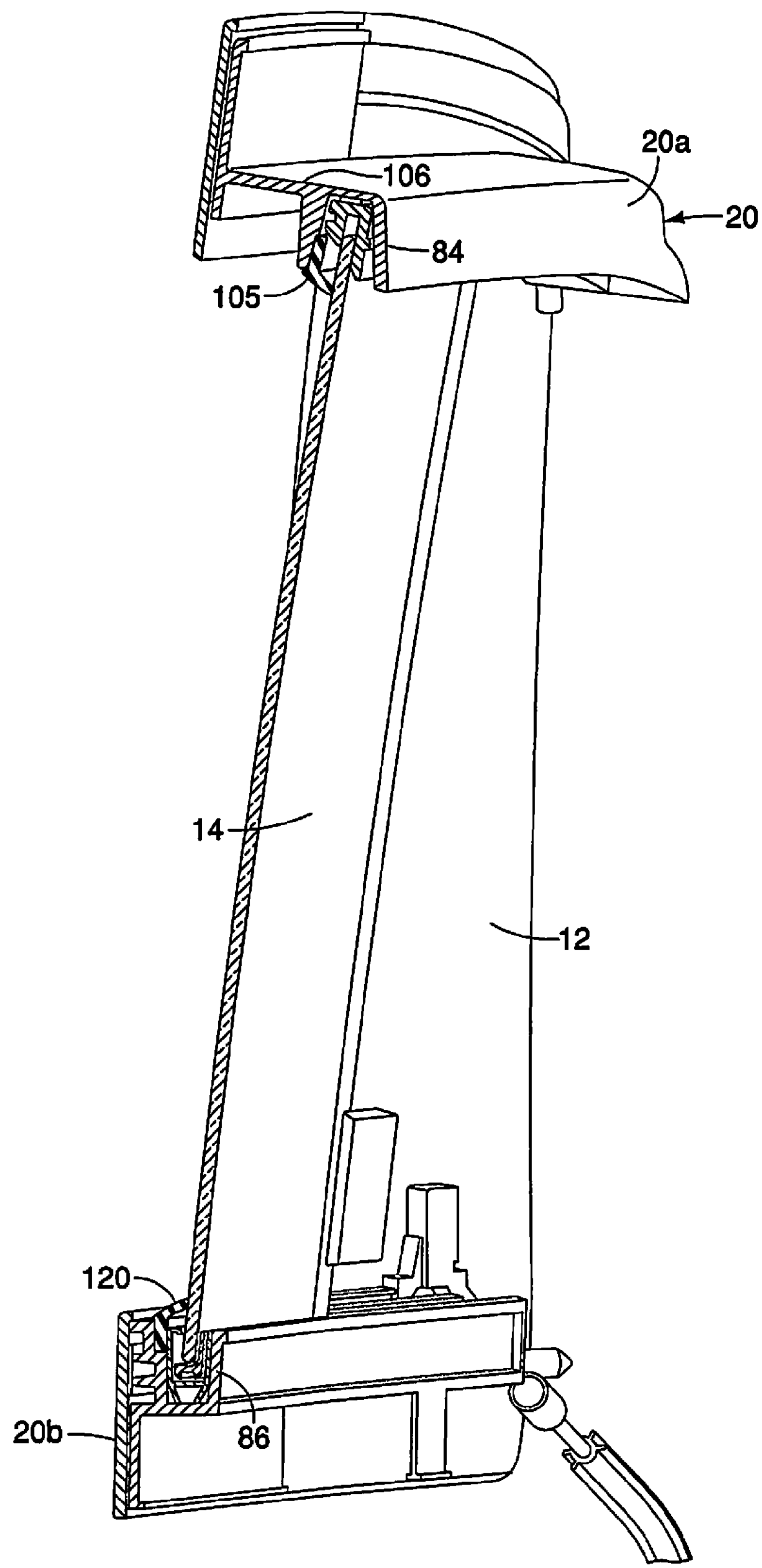
FIG. 8 is a front cross-sectional side perspective view of the vehicle window assembly shown in FIG. 7.

In one embodiment, as shown in FIG. 4, the vehicle window assembly 10 is configured such that the second transparent member 14 is movable relative to the first transparent member 12 to create an access opening 22 in the passenger compartment of the pick-up truck vehicle 100. The access opening 22 can be used for ventilation, or to provide access between the cargo bed and vehicle passenger compartment 16. As shown in FIGS. 5 and 6, the second transparent member 14 is disposed or mounted in the mounting structure 20 so as to be inboard of the first transparent member 12. That is, in one embodiment, the second transparent member 14 is disposed forward of the first transparent member 12 so as to be disposed further into the vehicle passenger compartment 16 than the first transparent member 12. The second transparent member 14 can also be disposed so as to be canted or angle to extend rearward away from the vehicle passenger compartment 16. In such an embodiment, the second transparent member 14 would be disposed so as to be outside of the first transparent member 12.

The second transparent member 14 is arranged such that when the second transparent member 14 moves relative to the first transparent member 12 so as to be in an open position, the second transparent member 14 overlies at least a portion of the first transparent member 12. That is, when fully opened, the second transparent member 14 can overlie the entirety or merely a portion 12*a* of the first transparent member 12. Moreover, the second transparent member 14 can be configured such that it can be in an open position or a partially opened position. For example, in a partially opened position, the second transparent member 14 would not be moved to the fully opened position and overlie a first portion of the first transparent member 12. However, when moved to a fully opened position, the second transparent member 14 would overlie a second portion of the first transparent member 12, the first portion being smaller than the second portion. Further, the second transparent member 14 is arranged such that when overlying any of the first portion and the second portion of the first transparent member 12, the second transparent member 14 maintains an angle relative to the first transparent member 12.

As shown in FIG. 4, the second transparent member 14 can be moved automatically via a motor 30. For example, a passenger inside of the vehicle passenger compartment 16 can activate a switch (not shown) that would move the second transparent member 14 relative to the first transparent member 12 to enable the access opening 22 to be formed in the vehicle window assembly 10. In the alternative, the second transparent member 14 can be moved manually. In this embodiment, the motor 30 can be eliminated or the user may simply manually move the second transparent member 14 rather than operate the second transparent member 14 via the switch and motor 30.

Turning back to FIGS. 1 and 2, in one embodiment, the first and second transparent members 12, 14 are disposed in the aperture 18, the aperture 18 being a rear aperture of the pick-up truck vehicle 100. In this embodiment, the first transparent member 12 includes a first portion 32 and a second portion 34, the second portion 34 being disposed on a side of the aperture 18 opposite the first portion 32. That is, when viewed from the rear of the vehicle 100 the first portion 32 of the first transparent member 12 is disposed in the left side of the pick-up truck vehicle 100 and the second portion 34 of the first transparent member 12 is disposed on the right side of the pick-up truck vehicle 100. The first and second portions 32, 34 of the first transparent member 12 can be separate portions or the first and second portions 32, 34 can be joined by a third glass portion 36 that extends therebetween. The third portion 36 extends between the first and second portions 32, 34 of the first transparent member 12 and can be located at the top 40 of the transparent window assembly 10, at the bottom 42 of the transparent window assembly 10 or any suitable location or combination of locations. The first transparent member 12 can be a single integral member containing all of the portions (i.e., the first, second and third portions) and defining the opening, or the first transparent member 12 can be comprised of separate panels on each side of the opening, with or without the upper and lower portions extending over and under the opening. However, it is preferable that in any configuration, the first transparent member 12 defines an access opening 22 therein, and the second transparent member 14 is configured to cover the access opening 22 when in the closed position.

In one embodiment, the first and second transparent members 12, 14 extend to a periphery 44 of the aperture 18. That is, as shown in FIG. 1, the entire vehicle window assembly 10, including the first and second transparent members 12, 14, extends to the periphery 44 of the aperture 18. The aperture 18 generally has a rectangular shape with the longer of the sides 46, 48 extending generally parallel to the ground and the shorter of the sides 50, 52 extending generally perpendicular to the ground. However, the aperture 18 can be any size or shape desired. Moreover, it is not necessary for the vehicle window assembly 10 to extend to the periphery 44 of the aperture 18. That is, the vehicle window assembly 10 can extend any suitable distance from the periphery 44 of the aperture 18 with any other suitable substance being disposed between the periphery 44 of the aperture 18 and the vehicle window assembly 10. Further, if desired, a portion of the glass structure or an entirety of the vehicle window assembly 10 can extend to the periphery 44 of the aperture 18.

As shown in FIGS. 5 and 6, the first transparent member 12 has an upper end 54 and a lower end 56 and the second transparent member 14 has an upper end 58 and a lower end 60, the upper end 54 of the first transparent member 12 being spaced a first distance from the upper end 54 of the second transparent member 14, and the lower end 56 of the first transparent member 12 being spaced a second distance from the lower end 60 of the second transparent member 14, the first distance being greater than the second distance. Thus, the second transparent member 14 extends away from the first transparent member 12 in an upward direction. Preferably, the second transparent member 14 forms an angle between approximately or about 2 degrees and 10 degrees, and more preferably approximately or about 4.5 degrees. However, the upper end 54 of the first transparent member 12 can be spaced a first distance from the upper end 58 of the second transparent member 14, and the lower end 56 of the first transparent member 12 being spaced a second distance from the lower end 60 of the second transparent member 14, the first distance being less than the second distance. For example, when the second transparent member 14 is disposed so as to be outside or further rearward of the first transparent window 12, it may be preferable to the upper end 54 of the first transparent member 12 can be spaced a first distance from the upper end 58 of the second transparent member 14, and the lower end 56 of the first transparent member 12 being spaced a second distance from the lower end 60 of the second transparent member 14, the first distance being less than the second distance.

The mounting structure 20 is preferably formed from plastic or any suitable polymer or other material or combination of materials. To form the angle between the first and second transparent members 12, 14, the mounting structure 20 includes an upper member 20*a* and lower member 20*b*. The upper member 20*a* preferably extends further inwardly to a passenger compartment of the pick-up truck vehicle 100 relative to the lower member 20*b*, such that the second transparent member 14 is disposed inboard of the first transparent member 12. In one embodiment, the upper end 54 of the first transparent member 12 and the upper end 54 of the second transparent member 14 are connected to the upper member 20*a* of the mounting structure 20 and lower end 56 of the first transparent member 12 and the lower end 56 of the second transparent member 14 are connected to the lower member 20*b* of the mounting structure 20.

Additionally, the mounting structure 20 includes a first vertical member 62 and a second vertical member 64 extending between the upper member 20*a* and the lower member 20*b*. Each of the first and second vertical members has a rear side, a front side, a first end and a second end. The rear side 66 of the first vertical member 62 and the rear side 68 of the second vertical member 64 are positioned closer to the rear of the vehicle 100 relative to the front side 70 of the first vertical member 62 and the front side 72 of the second vertical member 64. The front sides 70; 72 of the first and second vertical members 62, 64 extend forwardly into the vehicle passenger compartment 16 and away from the rear sides 66 and 68, such that a first end 74, 76 (or upper end) of each of the vertical members 62, 64 preferably extends further inwardly to the vehicle passenger compartment 16 of the pick-up truck vehicle 100 relative to the second end 78, 80 (or lower end). The first and second vertical members 62, 64 generally form an angle, between approximately or about 2 degrees and 10 degrees, between the front sides 70, 72 and rear sides 66, 68, and more preferably approximately or about 4.5 degrees. However, the vertical members 62, 64 can have the second end 78, 80 extend forwardly into the vehicle passenger compartment 16 and away from the rear side 66, 68 such that the second end 78, 80 (or lower end) of each of the vertical members 62, 64 preferably extends further inwardly to the vehicle passenger compartment 16 of the pick-up truck vehicle 100 relative to the first end 74, 76 (or upper end).

The vertical members 62, 64 are preferably spaced a predetermined distance apart. The predetermined distance is preferably about the width of the second transparent member 14, and the angle on inclination of the first end 74, 76 relative to the second end 78, 80 of the vertical members 62, 64 is the same angle of inclination of the second transparent member 14. Thus, the vertical members 62, 64 are capable of sealing the vehicle passenger compartment 16 from the exterior of the vehicle 100, when the second transparent member 14 is in a closed position. Moreover, the vertical members 62, 64 are generally disposed at about the inner peripheral area 82 of the first transparent member 12 and can define the access opening 22 formed by the first transparent member 12 or can be disposed adjacent the access opening 22 formed by the first transparent member 12. The vertical members 62, 64 can include any suitable material, elements, or combination thereof that would facilitate sealing the vehicle passenger compartment 16 from the exterior of the vehicle.

Figure 9:
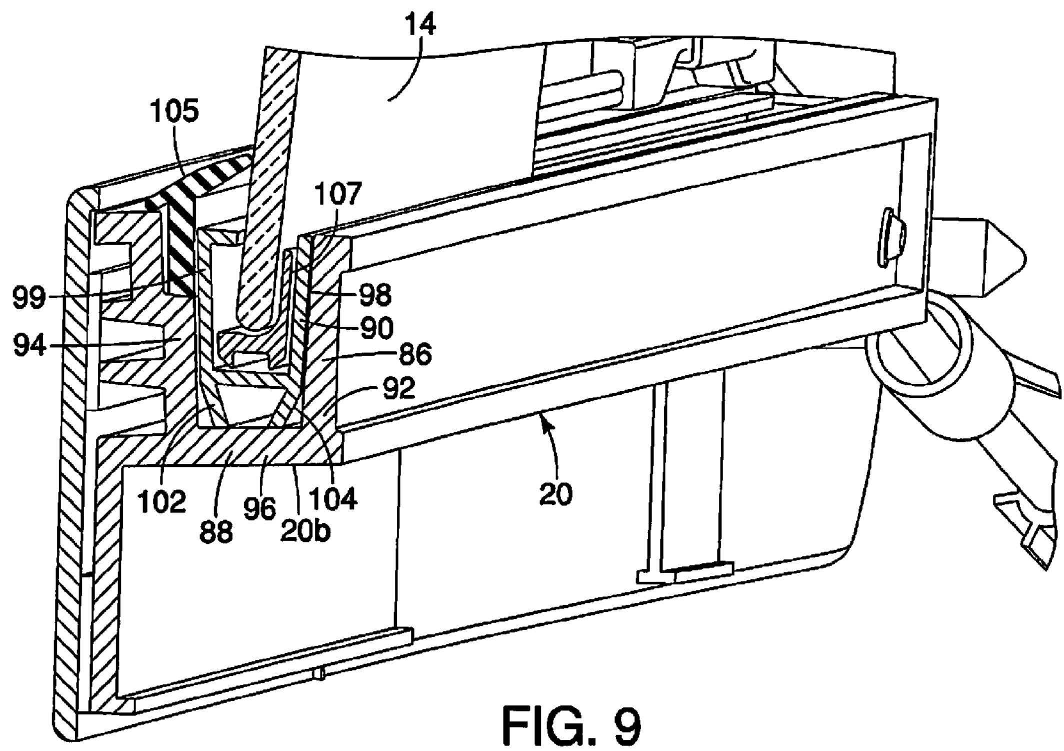
FIG. 9 is an enlarged front cross-sectional side perspective view of the bottom portion of the vehicle window assembly shown in FIG. 8.

As shown in FIGS. 6-10 illustrate enlarged portions and sectional views of the vehicle window assembly illustrated in FIG. 5. In FIGS. 6-10, the upper and lower members 20*a*, 20*b* of the mounting structure 20 include upper and lower tracks 84, 86, respectively. The upper and lower tracks 84, 86 are configured to enable the second transparent member 14 to move relative to the first transparent member 12. As shown in FIG. 9, the lower track 84 is defined by a U-shaped slot portion 88 and a sliding portion 90 configured to be disposed in the slot portion 88. The U-shaped slot portion 88 includes a first vertical member 92, a second vertical member 94 and horizontal member 96 between the first and second vertical members 92 and 94. In this embodiment, the second vertical member 94 is shorter than the first vertical member 92; however, the first and second vertical members 92, 94 can have any suitable size.

The sliding portion 90 of the lower member 20*b* is generally H-shaped, such that the second transparent member 14 fits between the two upper vertical legs 98, 99. However, the sliding portion 90 of the lower member 20*b* can be any suitable configuration. The sliding portion is configured to slide on the two lower vertical legs 102, 104 along the U-shaped slot of the lower member 20*b* upon activation of the motor 30 or manual manipulation to move the second transparent member 14. Moreover, a fitting member 107 can be disposed within the sliding portion 90 so as to enable the second transparent member 14 to be fit and held within the sliding portion 90. A rubber holding member 105 can also be used to hold the second transparent member 14 in place within the sliding portion 90. The holding member 105 can also prevent material from entering the vehicle passenger compartment 16 from the exterior of the vehicle 100.

Figure 10:
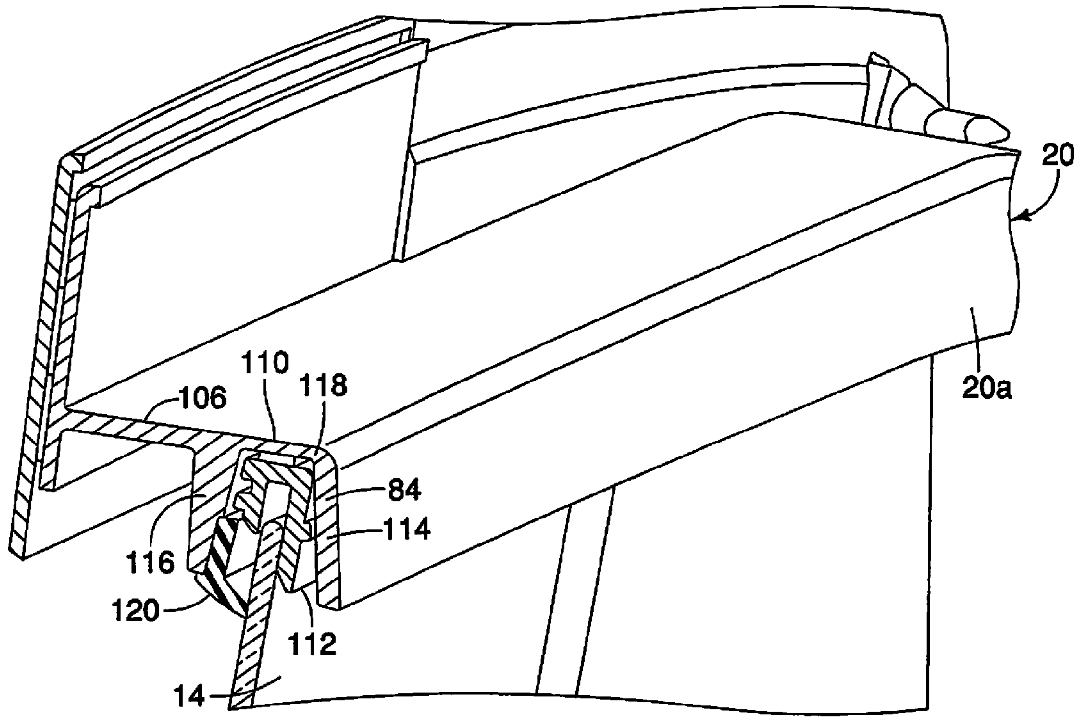
FIG. 10 is an enlarged front cross-sectional side perspective view of the top portion of the vehicle window assembly shown in FIG. 8.

As shown in FIG. 10, the upper member 20*a* has an extension 106 that enables the upper member 20*a* to extend further into the vehicle passenger compartment 16 than the lower member 20*b*. Additionally, the upper member 20*a* includes the upper track 84, which is defined by a downwardly facing U-shaped slot portion 110 and a sliding portion 112 configured to be disposed in the slot portion 110. The U-shaped slot portion includes a first vertical member 114, a second vertical member 116 and horizontal member 118 between the first and second vertical members 114, 116. In this embodiment, the second vertical member 116 is shorter than the first member 114; however, the first and second vertical members 114, 116 can have any suitable size.

A rubber holding member 120 can also be used to hold the second transparent member 14 in placed within the sliding portion 112. The holding member 120 can also prevent material from entering the vehicle passenger compartment 16 from the exterior of the vehicle 100.

The vertical pillars and cargo bed can be conventional components that are well known in the art. Since the vertical pillars and cargo bed may be any vertical pillars and cargo bed known in the art, these structures will not be discussed or illustrated in detail herein. Rather, it will be apparent to those skilled in the art from this disclosure that the components can be any type of structure that can be used to carry out the present invention.

The embodiments of the present invention provide a vehicle window assembly for a substantially vertical pillar (or any other pillar type) that reduces or eliminates reflection and glare inside of the interior passenger compartment of a vehicle, such a pick-up truck vehicle.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "section," "portion," "member" or "element" when used in the singular can have the dual meaning of a single part or a plurality of parts. Also as used herein to describe the above embodiment(s), the following directional terms "forward", "rearward", "front", "left", and "right" as well as any other similar directional terms refer to those directions of a vehicle equipped with the vehicle window assembly. Accordingly, these terms, as utilized to describe the present invention should be interpreted relative to a vehicle equipped with the vehicle The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle window assembly, comprising:

a first transparent member disposed in an aperture of a vehicle, and having an upper end and a lower end;

a second transparent member disposed in the aperture of the vehicle, and having an upper end and a lower end; and a mounting structure supporting the first transparent member and the second transparent member, and the second transparent member being supported by the mounting structure so as to be angled relative to the first transparent member, and such that the upper end of the first transparent member is spaced a first distance from the upper end of the second transparent member, and the lower end of the first transparent member is spaced a second distance from the lower end of the second transparent member the first distance being greater than the second distance.

2. The vehicle window assembly according to claim 1, wherein the aperture is a rear aperture of a passenger compartment of the vehicle.

3. The vehicle window assembly according to claim 1, wherein the first transparent member extends to a periphery of the aperture.

4. The vehicle window assembly according to claim 1, wherein the first transparent member includes a first portion and a second portion, the second portion being disposed on a side of the aperture opposite the first portion, the first and second portions defining an opening therebetween, and the second transparent member is configured to cover the opening.

5. The vehicle window assembly according to claim 1, wherein the mounting structure extends inwardly to a passenger compartment of the vehicle such that the second transparent member is disposed inboard of the first transparent member.

6. The vehicle window assembly according to claim 1, wherein the mounting structure includes a lower member and an upper member, and upper ends of the first and second transparent members are connected to the upper member and lower ends of the first and second transparent members are connected to the lower member.

7. The vehicle window assembly according to claim 6, wherein the upper and lower members include upper and lower tracks, respectively, the upper and lower tracks being configured to enable the second transparent member to move relative to the first transparent member.

8. The vehicle window assembly according to claim 6, wherein the mounting structure includes first and second side members extending between the upper and lower members, each of the first and second side members having a first end and a second end, each first end being wider than each second end.

9. The vehicle window assembly according to claim 1, wherein the second transparent member is configured to move relative to the first transparent member to seal an opening at least partially defined by the first transparent member when the second transparent member is in a closed position, and to at least partially expose the opening when the second transparent member is in an open position.

10. The vehicle window assembly according to claim 9, wherein the second transparent member is arranged such that when the second transparent member moves relative to the first transparent member so as to be in the open position, the second transparent member overlies at least a portion of the first transparent member.

11. The vehicle window assembly according to claim 10, wherein the second transparent member is arranged such that when overlying at the at least a portion of the first transparent member, the second transparent member maintains an angle relative to the first transparent member.

12. The vehicle window assembly according to claim 1, wherein the second transparent member is configured so as to be disposed inboard of the first transparent member.

13. A rear window structure for a passenger compartment of a vehicle, comprising:

a pair of vertical pillars defining a rear window aperture; and a window assembly installed in the rear window aperture comprising:

a first transparent member having an upper end and a lower end;

a second transparent member having an upper end and a lower end; and a mounting structure supporting the first transparent member and the second transparent member, with the second transparent member supported by the mounting structure to be positioned inboard of the first transparent member and angled relative to the first transparent member by having the upper end of the second transparent member positioned further inboard of the lower end of the second transparent member, and such that the upper end of the first transparent member is spaced a first distance from the upper end of the second transparent member, and the lower end of the first transparent member is spaced a second distance from the lower end of the second transparent member the first distance being greater than the second distance.

14. The rear window structure according to claim 13, wherein the first transparent member includes a first portion and a second portion, the second portion being disposed on a side of the aperture opposite the first portion, the first and second portions defining an opening therebetween, and the second transparent member is configured to cover the opening.

15. The rear window structure according to claim 13, wherein the mounting structure includes a lower member and an upper member, and upper ends of the first and second transparent members are connected to the upper member and lower ends of the first and second transparent members are connected to the lower member, the second transparent member is configured to move relative to the first transparent member to seal an opening at least partially defined by the first transparent member when the second transparent member is in a closed position, and to at least partially expose the opening when the second transparent member is in an open position.

16. The rear window structure according to claim 15, wherein the upper and lower members include upper and lower tracks, respectively, the upper and lower tracks being configured to enable the second transparent member to move relative to the first transparent member.

17. The rear window structure according to claim 15, wherein the mounting structure includes first and second side members extending between the upper and lower members, each of the first and second side members having a first end and a second end, each first end being wider than each second end.

18. The rear window structure according to claim 15, wherein the second transparent member is arranged such that when the second transparent member moves relative to the first transparent member so as to be in the open position, the second transparent member overlies at least a portion of the first transparent member.

19. The rear window structure according to claim 18, wherein the second transparent member is arranged such that when overlying at the at least a portion of the first transparent member, the second transparent member maintains an angle relative to the first transparent member.

* * * * *